Nov. 9, 1965  W. KASTEN  3,216,572
FILTER UNIT

Filed Nov. 24, 1961  2 Sheets-Sheet 1

INVENTOR.
WALTER KASTEN
BY
William N. Antonis
ATTORNEY

Nov. 9, 1965   W. KASTEN   3,216,572
FILTER UNIT

Filed Nov. 24, 1961   2 Sheets-Sheet 2

INVENTOR.
WALTER KASTEN
BY
William N. Antonis
ATTORNEY

United States Patent Office 3,216,572
Patented Nov. 9, 1965

3,216,572
FILTER UNIT
Walter Kasten, Madison Heights, Mich., assignor to The Bendix Corporation, Madison Heights, Mich., a corporation of Delaware
Filed Nov. 24, 1961, Ser. No. 154,557
5 Claims. (Cl. 210—97)

This invention relates to a filter unit of the type which may be used as a fuel monitoring device and more particuarly to improvements in a filter unit which includes a compressible edge-type filter element.

It is object of this invention to provide a filter unit having an edge-type filter element which, under all conditions, will retain at its rated flow a predetermined maximum particle size and which, once the rated flow has passed through the fuse, will not allow passage of larger particles through the filter element even when the flow rate is subsequently reduced.

More specifically, it is an object of this invention to provide a filter unit which utilizes an edge-type element having a first length at a first flow rate and a second shorter length at a second higher flow rate, in which means are provided for retaining said element at substantially said second shorter length at flow rates lower than the said second flow rate.

Another object of this invention is to provide a washer-type or ribbon-type filter unit in which the pores will not increase in size after the rated flow has passed therethrough but is subsequently reduced to a lower value.

The above and other objects and features of this invention will become apparent from the following description taken in connection with the accompanying drawings which form a part of this specification and in which.

Figure 1:
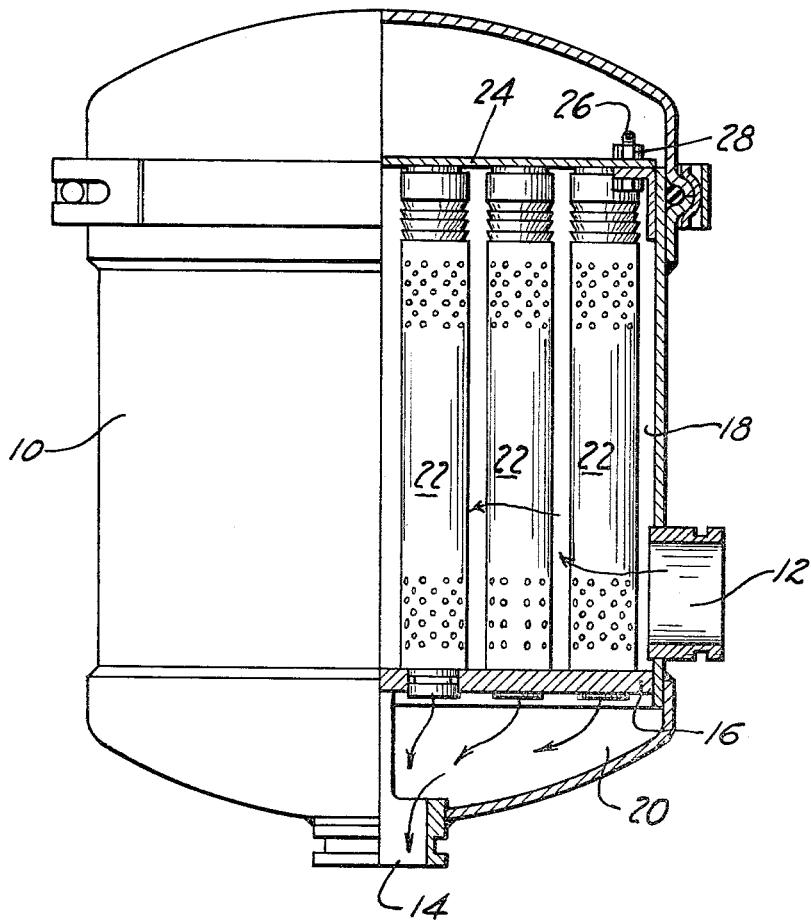
FIGURE 1 is a view partially in section showing a plurality of the filter units incorporating my invention.

Referring to FIGURE 1 of the drawings, it will be seen that numeral 10 indicates a tank having a fuel inlet port 12 and a fuel outlet port 14. Suitably attached to the housing is a partition 16 which separates the interior of the housing into an inlet chamber 18 and an outlet chamber 20. A plurality of filter units 22 (only three of which are shown) are suitably attached to partition 16 and are retained in position by a retainer plate 24 which is operatively connected to housing 10 by three bolts 26 and nuts 28 (only one of which is shown). The direction of flow through the tank is indicated by the arrows.

Figure 2:
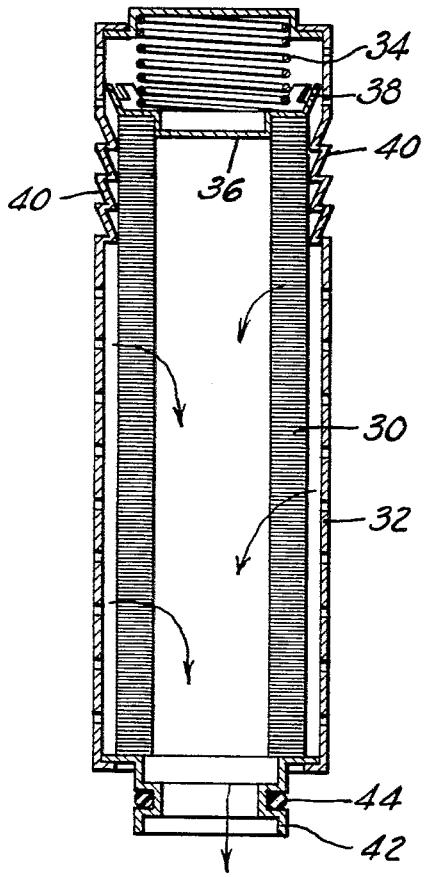
FIGURE 2 is an enlarged sectional view of one of the filter units incorporating my invention.

Each filter unit 22, as seen in FIGURE 2, includes a porous compressible tubular filter element 30 formed by a plurality of washer-like elements in registered face to face contact or by a ribbon-like material wound edgewise. The method for winding and making the ribbon-type element is disclosed and claimed in my Patent No. 2,421,704 issued June 3, 1947. These elements may be formed from paper, cellulose, or other suitable fibrous or nonfibrous material.

Figure 3:
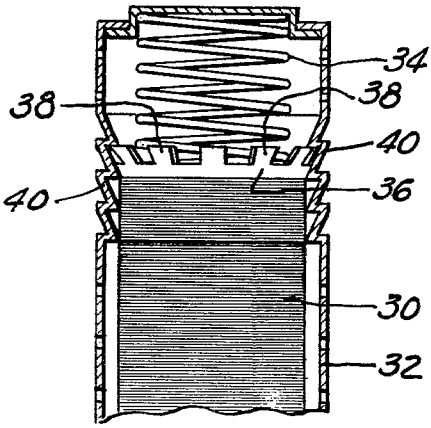
FIGURE 3 is a sectional view similar to FIGURE 2 showing the filter element is a locked position.
Figure 4:
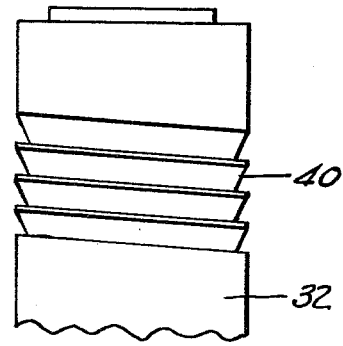
FIGURE 4 is a plan view showing another embodiment of my invention.

The edge-type element 30, which is located in a perforated tube 32, is placed under a calibrated precompression by a spring 34 which is located at the closed end of the tube 32. Located between the spring and the end of the filter element 30 is an endplate 36 having a plurality of spring-type prongs 38 extending therefrom for engagement with the saw-tooth shaped internal projections 40 which are embossed on the tube 32, as shown in FIGURES 2, 3 and 4. The internal projections may be individual unconnected projections as shown in FIGURES 2 and 3 or may be rolled into the tube in a helix similar to the lead in a thread, as shown in FIGURE 4. A ferrule 42, having an O-ring seal 44, is suitably attached to the other end of the tube 32.

It will be noted that flow of fluid through each filter unit 22 is from outside-in, as shown in FIGURE 2, and that as a result of such flow the endplate is subject to a pressure differential equal to the pressure drop across the filter element 30. Since the higher inlet pressure is communicated to the top side of the endplate 36 and the lower outlet pressure is communicated to the opposite side of the endplate, the result will be to cause movement of the endplate towards the filter element and consequent additional compression of the filter element. During normal operations, the compression of the edge-type element 30 is the algebraic sum of its precompression load, the spring load acting thereon and the force exerted against the endcap resulting from the differential pressure acting thereon. Under static nonflow conditions the force exerted against the endcap will be zero. If during static nonflow conditions the filter element precompression load is greater than the spring load, then the spring will be compressed to its solid height. If under certain dynamic flow conditions the filter element precompression load is greater than the sum of the spring load plus the differential pressure force acting against the end cap, then the spring will still remain in its compressed solid state.

Since for a given set of conditions, the differential pressure across the filter element increases with the increase of fluid flow, it will be apparent that if the filter element 30 is subjected to the maximum flow rate, it will be under maximum compression. Under such maximum compression the filter element will prevent the passage of all solid contaminants larger than the radially extending pores formed between the layers of the edge-type element. If, after some of the solid contaminants have accumulated at the outer edges of the layered edge-type filter element, the flow rate to the element is substantially reduced, the pressure differential will also be reduced. This in turn will reduce the compression on the filter pack and increase the size of the pores between the layers of the filter. Since the pores are now larger, some of the previously retained solids will now be permitted to pass at the lower flow rate. To prevent this from happening, the endplate 36 has been provided with the spring-type prongs 38 for engagement with the internal projections 40 formed on the perforated tube 32. Thus, once the maximum compression load is reached at the maximum flow rate, the endplate 36 will have moved to a position which will permit the prongs 38 to engage the internal projections 40, as shown in FIGURE 3, and thereby lock the endplate in a position which will prevent any relaxation or breathing of the filter pack. In other words, use of this locking means will maintain the filter pack at substantially its maximum compression load and at substantially its shortest length once such conditions are reached. In this manner the filter pore size will remain substantially constant at all flow rates once the mechanical locking means has taken hold.

It will be obvious from the aformentioned description, and in particular to those familiar with refueling operations, that my invention is particularly suitable for edge-type filter units or fuse assemblies which are used in fuel monitoring devices of the type shown in my application Serial No. 39,101, filed June 27, 1960, now Patent No. 3,117,925. Thus, if my invention is utilized in such a device, it will be appreciated that during refueling, and especially at times when the fuel nozzle is successively opened and closed to completely fill the fuel tank without spillage, that the alternate full and partial flows of fuel resulting from such opening and closing of the fuel nozzle will not cause a variation in the size of the filter element pores since my novel locking means will prevent such a variation.

Those acquainted with this art will readily understand that the invention herein set forth is not necessarily limited and restricted to the precise and exact details presented and that various changes and modifications may be resorted to without departing from the spirit of my invention. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A filter unit comprising a perforated tube having internal projections extending radially inwardly from the inner surface thereof, a plurality of washer-like elements in registered face to face contact located within said perforated tube to form a compressible tubular element having radially extending pores between said washer-like elements for permitting flow of fluid therethrough from the outside of the tubular element to the inside of the tubular element, said tubular element having a first length for static nonflow conditions when the pressure of the fluid outside the tubular element is equal to the pressure of the fluid inside the tubular element and a shorter second length for a given predetermined flow rate when the pressure of the fluid outside the tubular element is greater than the pressure of the fluid inside the tubular element by a predetermined amount, a ferrule operatively connected to one end of said tube and abutting one end of said tubular element, closure means formed on the other end of said tube, a movable endplate located within said tube and abutting the other end of said tubular element, said endplate having one side thereof communicating with the fluid outside the tubular element and the other side thereof communicating with the fluid inside the tubular element so that when the fluid pressure outside the tubular element is greater than the fluid pressure inside the tubular element by a predetermined amount the endplate will be urged toward said tubular element by the differential fluid pressure acting thereacross at said given flow rate to thereby compress said tubular element to said shorter second length, a spring confined within said tube between said closure means and said endplate, and spring-type prongs extending radially outwardly from said endplate for engagement with said internal projections when the differential fluid pressure acting across said endplate reaches said predetermined amount to thereby retain said tubular element at substantially said shorter second length at differential fluid pressures less than said predetermined amount.

2. A filter unit as defined in claim 1 wherein said internal projections are individual unconnected saw-tooth shaped projections.

3. A filter unit as defined in claim 1 wherein said internal projections comprise a saw-tooth shaped internal thread rolled into the tube.

4. A filter unit comprising a perforated tube having internal projections extending radially inwardly from the inner surface thereof, a layered edge-type compressible tubular element having radially extending pores formed between said layers for permitting flow of fluid therethrough from the outside of the element to the inside of the element, said tubular element having one end thereof abutting one end of said tube and having a first length for static nonflow conditions when the pressure of the fluid outside the tubular element is equal to the pressure of the fluid inside the tubular element and a shorter second length for a given predetermined flow rate when the pressure of the fluid outside the tubular element is greater than the pressure of the fluid inside the tubular element by a predetermined amount, means for closing off the other end of said tube, a movable endplate located within said tube and abutting the other end of said tubular element, said endplate having one side thereof communicating with the fluid outside the tubular element and the other side thereof communicating with the fluid inside the tubular element so that when the fluid pressure outside the tubular element is greater than the fluid pressure inside the tubular element by a predetermined amount the endplate will be urged toward said tubular element by the differential fluid pressure acting thereacross at said given flow rate to thereby compress said tubular element to said shorter second length, and resilient means extending radially outwardly from said endplate for engagement with said internal projections when the differential fluid pressure acting across said endplate reaches said predetermined amount to thereby retain said tubular element at substantially said shorter second length at differential fluid pressures less than said predetermined amount.

5. A filter unit comprising a tube having a fluid inlet and a fluid outlet, said tube having internal projections extending radially inwardly from the inner surface thereof, an edge-type compressible tubular filtering element located in said tube between said fluid inlet and outlet so that the outside thereof communicates with said inlet and the inside thereof communicates with said outlet, said element having one end thereof abutting said tube, an endplate for closing the other end of said element, said endplate having one side thereof communicating with the fluid inlet and the other side thereof communicating with the fluid outlet so that a predetermined increase in the pressure differential acting across said endplate resulting from an increase in the rate of flow through said filtering element will cause compression of said element from a first length to a shorter second length, and resilient means extending radially outwardly from said endplate for engagement with said internal projections when said predetermined increase in the pressure differential across said endplate is reached to thereby retain said element at substantially said shorter second length at differential pressures less than those causing said filter element to be compressed to said shorter second length.

References Cited by the Examiner

UNITED STATES PATENTS

| | | | |
|---|---|---|---|
| 2,364,617 | 12/44 | Bolser | 210—282 X |
| 2,382,278 | 8/45 | Widman | 210—488 X |
| 2,461,736 | 2/49 | Hooper | 210—492 X |
| 2,670,851 | 3/54 | Curtis | 210—488 X |
| 2,742,155 | 4/56 | Sather | 210—97 |
| 2,856,076 | 10/58 | Whipple | 210—352 |

REUBEN FRIEDMAN, *Primary Examiner.*

HERBERT L. MARTIN, *Examiner.*